US010848424B2

United States Patent
Goswami et al.

(10) Patent No.: US 10,848,424 B2
(45) Date of Patent: Nov. 24, 2020

(54) METHOD AND SYSTEM FOR IMPROVING SWITCHING CAPACITY OF SOFTWARE-BASED SWITCHES IN ACCESS NETWORKS

(71) Applicant: Wipro Limited, Bangalore (IN)

(72) Inventors: Rishin Goswami, Kolkata (IN); Souvik Dutta, Kolkata (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/365,915

(22) Filed: Mar. 27, 2019

(65) Prior Publication Data
US 2020/0314009 A1    Oct. 1, 2020

(30) Foreign Application Priority Data
Mar. 26, 2019   (IN) .............................. 201941011792

(51) Int. Cl.
*H04L 12/861* (2013.01)
*H04L 12/741* (2013.01)
*H04L 12/721* (2013.01)

(52) U.S. Cl.
CPC ............ *H04L 45/745* (2013.01); *H04L 45/38* (2013.01); *H04L 49/9042* (2013.01)

(58) Field of Classification Search
CPC ........................... H04L 45/38; H04L 49/9042
See application file for complete search history.

(56) References Cited

U.S. PATENT DOCUMENTS

| | | | | |
|---|---|---|---|---|
| 7,929,536 B2* | 4/2011 | Kumar | .................. | H04L 69/161 370/392 |
| 7,937,499 B1* | 5/2011 | Tripathi | .................. | G06F 13/24 709/232 |
| 8,966,222 B2* | 2/2015 | Pakhunov | ............... | G06F 9/544 712/10 |
| 2001/0049744 A1* | 12/2001 | Hussey | ............... | G06F 9/30043 709/238 |
| 2004/0213243 A1* | 10/2004 | Lin | ..................... | H04L 12/4666 370/395.1 |

(Continued)

OTHER PUBLICATIONS

Internet Mix, Feb. 12, 2019, retrieved from the internet: <https://en.wikipedia.org/wiki/Internet_Mix>.

(Continued)

*Primary Examiner* — Fahmida S Chowdhury
(74) *Attorney, Agent, or Firm* — Finnegan, Henderson, Farabow, Garrett & Dunner, LLP

(57) ABSTRACT

This disclosure relates to a method of improving switching capacity in a software-based network switch. The method may involve storing a data packet in a first local buffer, storing one or more header fields of the data packet in a second local buffer. A common identifier may be assigned to the data packet stored in the first local buffer and the one or more header fields stored in the second local buffer. The one or more header fields may be directly sent from the NIC to the CPU for the data packet processing. At least one header field of the one or more header fields may be modified by the CPU. Further, the one or more header fields may be overwritten with the at least one modified header field in the data packet stored in the first local buffer of the NIC based on the common identifier.

12 Claims, 7 Drawing Sheets

(56) References Cited

U.S. PATENT DOCUMENTS

| | | | |
|---|---|---|---|
| 2006/0265517 A1* | 11/2006 | Hashimoto | H04L 69/12 709/245 |
| 2010/0121969 A1* | 5/2010 | Levitan | H04L 45/38 709/231 |
| 2013/0262868 A1* | 10/2013 | Friedman | G06F 21/72 713/171 |
| 2014/0029617 A1* | 1/2014 | Wang | H04L 45/38 370/392 |
| 2018/0113788 A1* | 4/2018 | Mola | G06F 12/084 |
| 2018/0159803 A1* | 6/2018 | Cornett | H04L 49/90 |
| 2018/0288197 A1* | 10/2018 | Izenberg | G06F 17/30545 |

OTHER PUBLICATIONS

McKeown et al., OpenFlow: Enabling Innovation in Campus Networks, ACM SIGCOMM Computer Communication Review, vol. 38, No. 2, Apr. 2008.

PCI Express, Mar. 23, 2019, retrieved from the internet: <https://en.wikipedia.org/wiki/PCI_Express#PCI_Express_3.0>.

* cited by examiner

FIG. 3A

| PRE | ETHERNET | | | IPV6 | | | | | | | TCP | PAYLOAD |
|---|---|---|---|---|---|---|---|---|---|---|---|---|
| | DEST MAC | SRC MAC | 802.1Q | TYPE | VERSION | TRAFFIC | FLOW | LENGTH | HEADER | HOP | SRC ADDR | DST ADDR | SRC PORT | DEST PORT | OTHER | DATA |
| | | | | 0X86DD | | | | | 0X6 | | | | | 0X50 | | |

← COMPLETE DATA PACKET 305

FIG. 3B

| ETHERNET | | | IP | | | | TCP/UDP | |
|---|---|---|---|---|---|---|---|---|
| VLAN ID 802.1Q | SRC MAC | DEST MAC | TYPE | SRC ADDR | DST ADDR | PROTO | TRAFFIC | HEADER | SRC PORT | DEST PORT |

← SELECTIVELY EXTRACTED HEADER FIELDS 310

| | IN PORT | VLAN ID | ETHERNET | | | IP | | PROTO | | TCP/UDP | |
|---|---|---|---|---|---|---|---|---|---|---|---|
| | | | SRC MAC | DEST MAC | TYPE | SRC ADDR | DST ADDR | TRAFFIC / HEADER | | SRC PORT | DEST PORT |
| IPV4 | 2 | 4 | 6 | 6 | 2 | 4 | 4 | 2 | | 2 | 2 |
| IPV6 | 2 | 4 | 6 | 6 | 2 | 16 | 16 | 4 | | 2 | 2 |

FIG. 3C

| STATUS | | | | | | BUFFER POINTER ARRAY | COMMON IDENTIFIER |
|---|---|---|---|---|---|---|---|
| TRR | TI | O | TY | BS | PR | | |

FIG. 3D

METHOD AND SYSTEM FOR IMPROVING SWITCHING CAPACITY OF SOFTWARE-BASED SWITCHES IN ACCESS NETWORKS

This application claims the benefit of Indian Patent Application Serial No. 201941011792, filed Mar. 26, 2019, which is hereby incorporated by reference in its entirety.

FIELD

This disclosure relates generally to packet-switching device in a communication network, and more particularly to improving switching capacity in software-based network switches in access networks.

BACKGROUND

In the traditional IT environment, a network switch (also called switching hub or bridging hub) is defined as a piece of hardware that utilizes packet switching to receive, process and forward data between devices within a computer network. Today, with the global rise of server virtualization, traditional network switches are being gradually replaced with Software-Defined Network (SDN) system that rely on the code as opposed to network bridges and hardware.

Such Software based switching system may be built through an openflow protocol as a main implementation on support hardware devices (e.g., general purpose hardware (such as Intel x86)). However, such switches are only used in the data center edges as opposed to access networks due to limitation in switching capacity. The primary reason is that the maximal switching capacity of the general-purpose hardware is considerably lesser, due to bandwidth of the system bus used in the software based switch. For example, in software based switch, the packets received at the Network Interface Card (NIC) are put into the RAM using Direct Memory Access (DMA), which are then processed by the CPU.

Both the NIC to RAM transfer and the RAM to CPU transfer of the data packets may use the system bus. A large amount of the system bus bandwidth is consumed because of frequent transfer of each data packet from NIC to RAM and then from RAM to CPU through the system bus. Thus, the system bus bandwidth is considerably lower than the switching capacity needs, this becomes a bottleneck for software based switches.

As a consequence of the limited switching capacity, both the Capital Expenditure (CapEx) and Operational Expenditure (OpEx) cost per bandwidth of the switching capacity is considerably higher when using a general-purpose hardware for the switching network device.

SUMMARY

In one embodiment, a method of improving switching capacity in software-based switches in access networks is disclosed. The method may involve storing the incoming data packet in a first local buffer in in-built memory buffer of the NIC, selectively extracting one or more header fields from each data packet in the NIC and storing the one or more header fields in the second local buffer. A common identifier may be assigned to the data packet stored in the first local buffer and the one or more header fields stored in the second local buffer. The one or more header fields may be directly sent from the NIC to the CPU for the data packet processing. At least one header field of the one or more header fields may be modified by the CPU based on flow control information pre-defined for the data packet. Further, the one or more header fields may be overwritten with the at least one modified header fields in the data packet stored in the first local buffer of the NIC based on the common identifier.

In one embodiment, a software-based network switch is disclosed. In one example, the software-based network switch may include a NIC and a CPU. The NIC may store the incoming data packet in a first local buffer in in-built memory buffer of the NIC, selectively extract one or more header fields from each data packet in the NIC and then store the one or more header fields in the second local buffer. Further, the NIC may assign a common identifier to the data packet stored in the first local buffer and the one or more header fields stored in the second local buffer. The CPU may access the one or more header fields directly from the NIC, for the packet processing. At least one header field of the one or more header fields may be modified by the CPU based on flow control information pre-defined for the data packet. Further, the one or more header fields may be overwritten with the at least one modified header fields in the data packet stored in the first local buffer of the NIC based on the common identifier.

In one embodiment, a non-transitory computer-readable medium storing computer-executable instructions for improved switching capacity in a software-based network switch is disclosed. In one example, the stored instructions, when executed by a processor, may cause the processor to perform operations including receiving a data packet by the NIC; storing, by the NIC, the data packet in a first local buffer of the NIC and one or more header fields associated with the data packet in a second local buffer of the NIC, wherein the data packet stored in the first local buffer and the one or more header fields stored in the second local buffer are assigned a common identifier; accessing, by a CPU associated with the software-based network switch, the one or more header fields from the second local buffer; modifying, by the CPU, at least one header field of the one or more header fields based on flow control information pre-defined for the data packet; overwriting, by the NIC, the one or more header fields with the at least one modified header fields in the data packet stored in the first local buffer of the NIC based on the common identifier; and routing, by the NIC, the data packet based on the at least one modified header fields.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 3A and 3B illustrates an example data packet and extracted one or more header fields for packet processing, according to an exemplary embodiment of the present disclosure.

FIG. 3C illustrates selective extraction of header fields with varied size for different data packets, according to another exemplary embodiment of the present disclosure.

FIG. 3D illustrates a redesigned buffer descriptor of the data packet, according to another exemplary embodiment of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
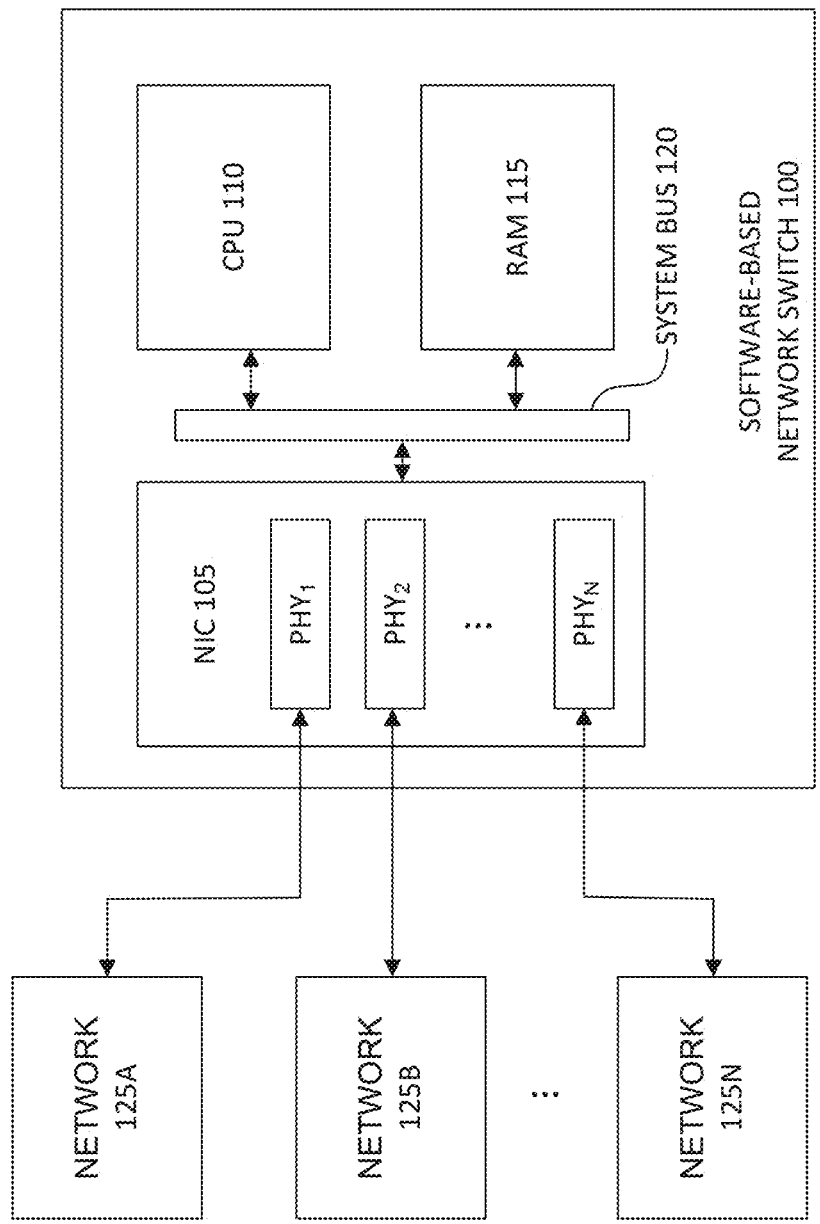
FIG. 1 is a network system including a software-based network switch used to communicate data between networks.

Referring now to FIG. 1, a simplified network diagram is shown of a network system including a software-based network switch 100 that are used to communicate data between networks 125A-125N. Example network 125 can be any type of network capable of transmitting data and other information between various devices such as computers, mobile devices, work stations, file servers, modems, printers, or any other device that are coupled to the network. Example software-based network switch 100 may be any data switching devices, such as an IP switches that are coupled with each other using a bidirectional communication link.

Such software-based network switch 100 may include a NIC 105, CPU 110 and RAM 115 so as to perform TCP/IP packet processing for receiving data packets and transmitting the data packets. Typically, upon receiving the packets at the NIC hardware from the network 125, the NIC 105 may extract the entire packet embedded inside the frame and updates a transmit descriptor with the packet information. Used herein, "transmit descriptor" is a memory location of a transmit buffer in the RAM 115. Then, the NIC 105 may copy the incoming/ingress data packet into pre-allocated buffer indicated in the transmit descriptor using DMA operation over a system bus 120. Once the packet is placed in the RAM 115, the NIC 105 may generate an interrupt to the CPU 110 to initiate the TCP/IP protocol processing of the incoming packet. Then, the CPU 110 may read packets from the RAM 115 and does TCP/IP protocol processing to form an outgoing/egress packet.

Similarly, in the typical network switch at the time of transmitting packets, the CPU 110 may copy the egress packet into the RAM 115 and then updates a receive descriptor with the egress packet. Used herein, "receive descriptor" is a memory location of a pre-allocated buffer in the RAM 115 to write back the egress packet in a receive buffer. The NIC driver (not shown in FIG. 1) triggers a DMA engine in the NIC 105 to transfer the egress packet from the RAM 115 to the NIC buffers and then the NIC 105 sends them over communication channel of the network 125.

As described above, both the NIC to RAM transfer and the RAM to CPU transfer uses the system bus 120. A large amount of the system bus bandwidth is consumed because of frequent transfer of each of the entire/complete data packet from NIC 105 to RAM 115 and then from RAM 115 to CPU 110 through the system bus 120. Thus, the system bus bandwidth is considerably lower than the switching capacity needs, this becomes a bottleneck for software-based network switch 100. Further, for storing the ingress packet and the egress packet, two separate tx/rx buffer descriptors are allocated by the CPU 110 that may increase the processing capacity and memory capacity of the software-based network switch 100.

Various embodiments of the present technique may overcome one or more of the drawbacks by storing the incoming data packet in a first local buffer in in-built memory buffer of the NIC, selectively extracting one or more header fields from each data packet in the NIC and storing the one or more header fields in the second local buffer. A common identifier may be assigned to the data packet stored in the first local buffer and the one or more header fields stored in the second local buffer. The one or more header fields may be directly sent from the NIC to the CPU for the TCP/IP packet processing. At least one header field of the one or more header fields may be modified by the CPU based on flow control information pre-defined for the data packet. Further, the one or more header fields may be overwritten with the at least one modified header fields in the data packet stored in the first local buffer of the NIC based on the common identifier. Thus, providing direct access of the one or more header fields between the NIC and the CPU through a system bus. This is explained in detail in conjunction with FIGS. 2-5 of the description.

Figure 2A:
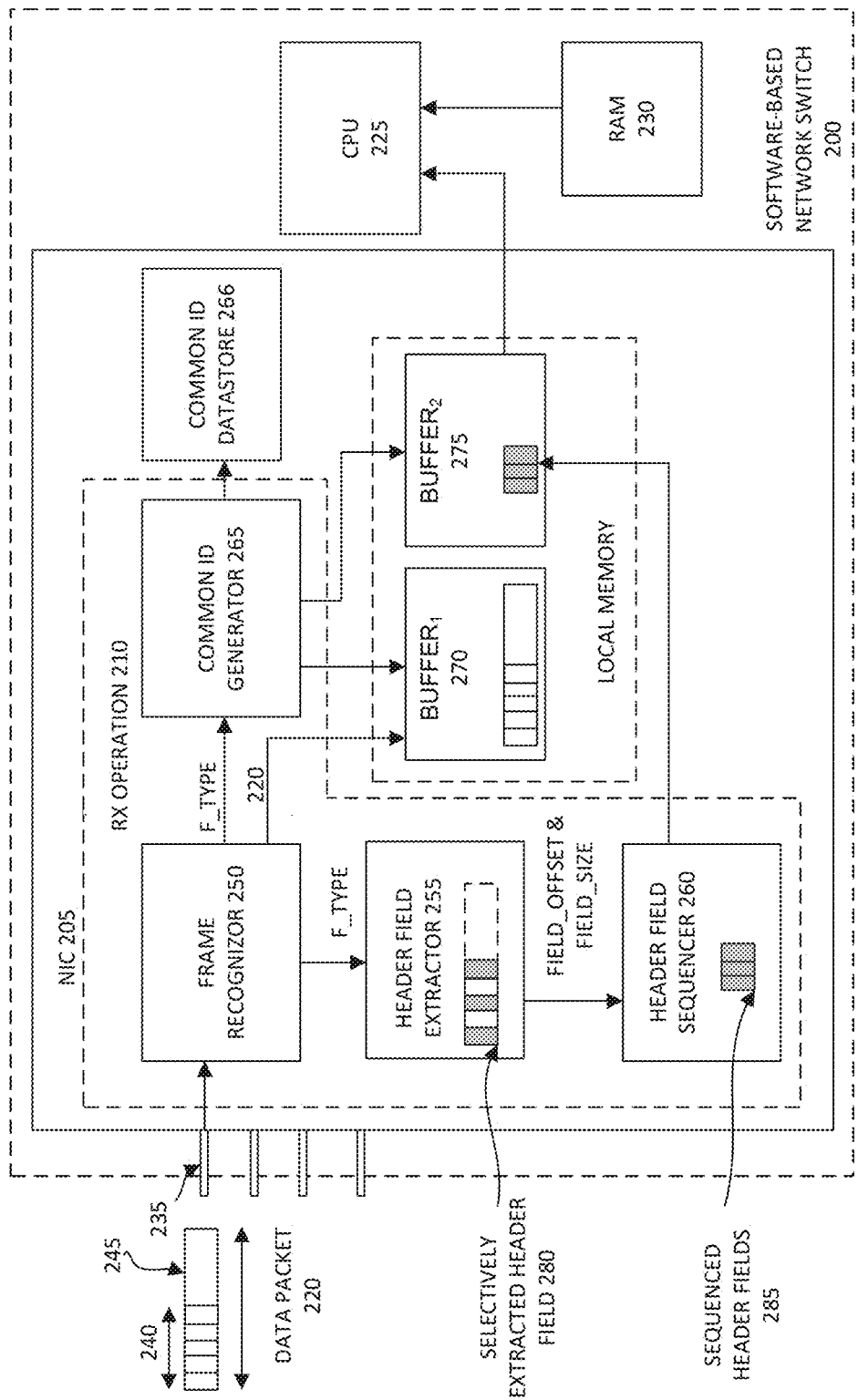
FIGS. 2A and 2B are functional block diagrams of a software-based network switch 200 including Network Interface Controller (NIC) 205 that performs receive (RX) operation 210 and transmit (TX) operation 215 of data packet 220 according to an exemplary embodiment of the present disclosure.
Figure 2B:
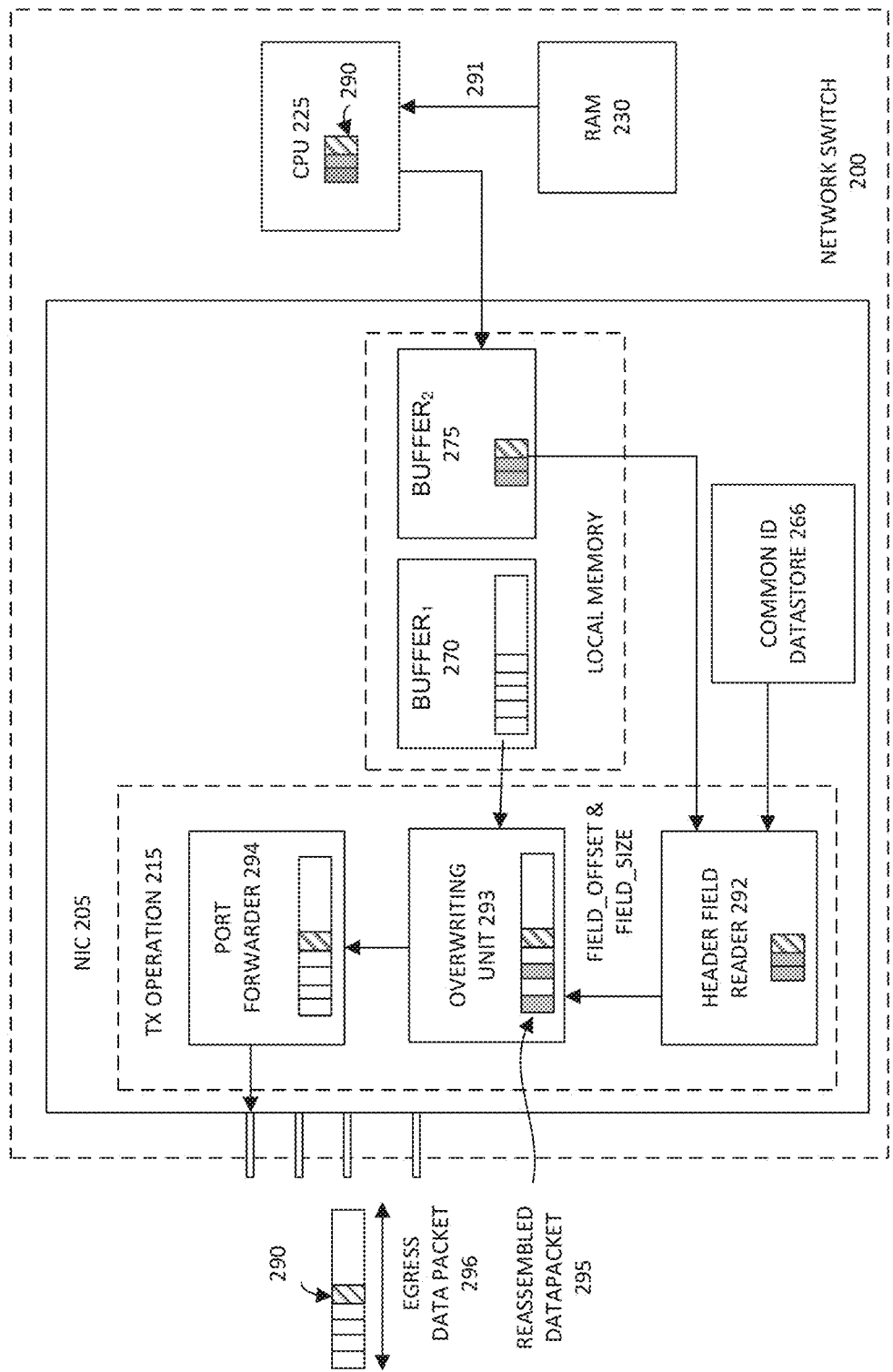

FIGS. 2A and 2B are a functional block diagram of a software-based network switch 200 including Network Interface Controller (NIC) 205 that performs receive (RX) operation 210 and transmit (TX) operation 215 of data packet 220, respectively, according to an exemplary embodiment of the present disclosure. Further, the software-based network switch 200 may include CPU 225 and RAM 230 that are communicatively connected to the NIC 205 via a system bus, for receiving ingress data packet 220 and transmitting egress data packet 296. The NIC 205 may include a plurality of PHY 235 for receiving and transmitting a plurality of data packets. The CPU 225 may be a general purpose processing unit where a routing software is executed. The RAM 230 may store flow control rules that determine the routing, security and traffic engineering policies associated with each data packet 220 to be routed.

During receive (RX) operation 210, the NIC 205 may receive the data packet 220 at an PHY 235 (i.e., interface port). Example data packet 220 may include a header 240 and a payload 245. As shown in FIG. 2A, the NIC 205 may include a frame recognizer 250, a header field extractor 255, and a header field sequencer 260 to perform "frame recognition", "multi-stage header field extraction", and "common identifier (ID) assignment" corresponding to the data packet 220, respectively. The term "frame recognition" may refer to a process of categorizing the type of data packet 220. Example data packet 220 may be categorized as one of IP/TCP/Ethernet packet, IP/TCP/SNAP packet and IP/TCP/Ethernet+VLAN packet. In one example, the data packet 220 may be matched to a predefined template so as to generate a Frame Type (F_Type) value which uniquely identifies the type of data packet 220. Alternatively, the frame recognizer 250 of the NIC 205 may include an automated search mechanism to generate F_Type value for standard packet types. At the time of frame recognition, the data packet 220 may be stored in a first local buffer 270 of the NIC 205.

Followed by frame recognition of the data packet 220, the header field extractor 255 of the NIC 205 may selectively extract one or more header fields 280 associated with the data packet 220 and store the one or more header fields 280 in a second local buffer 275 of the NIC 205. The one or more header fields may include necessary header data required by the CPU 225 of the network switch 200 to perform TCP/IP processing. Example one or more header fields 280 may include "In port" field, "VLAN ID" field, "Ethernet Source Address (SA)" field, "Ethernet Destination Address (DA)" field, "Ethernet type" field, "IP Source Address (SA)" field, "IP Destination Address (DA)" field, "IP Protocol type" field, "TCP/UDP source" field, and "TCP/UDP Destination" field.

The header field extraction may be a "multi-stage field extraction" that includes a multiple stages of header field extraction performed in a pipeline or parallel manner. In each stage of header field extraction, one header field 280 may be extracted from the data packet 220. In one example, for each stage, a field-offset and a field-size may be defined for each header field. Used herein, "field-offset" is indicative of offset of the header field in bits to be extracted and "field-size" is indicative of the size of the header field in bits to be extracted. For example, ETH_VLANID OFFSET, ETH_IEEE8021P_OFFSET, ETH_SA_OFFSET, and IP_SA_OFFSET.

The one or more header fields 280 extracted at each stage may be sequenced in accordance to the field-offset and field-size of each header field, in order to form a sequenced header fields 285. The total size of the extracted header fields is calculated as total-field size. The total-field size of the extracted header fields can be varied for the different type of data packet.

In one example, the common ID generator 265 of the NIC 205 may assign a common identifier to the complete data packet stored in the first local buffer 270 and the one or more header fields 275 stored in the second local buffer 275. Used herein, the common identifier may be used by the NIC 205 to identify the one or more header fields 285 pertaining to the data packet 220. In another example, upon mapping the extracted header fields 285, total-field size of the sequenced header fields 285, and Frame Type (F_Type) of the sequenced header fields 285, the common ID generator 265 may assign a common identifier to the data packet stored in the first local buffer 270 and the one or more header fields stored in the second local buffer 275. Further, the mapping data and the common ID may be stored in a common ID datastore 266. In one example, the mapping data may map the Frame-type and total field size extracted from the data packet (i.e., stored in first local buffer 270) to the Frame-type and total field size of the one-more header fields (i.e., stored in first local buffer 275).

Further, the NIC 205 may map the common identifier to a buffer descriptor which is used to track a direct transfer of the one or more header fields 285 between the NIC 205 and the CPU 225. The buffer descriptor is explained in detail in FIG. 3D.

Upon mapping the common identifier to the buffer descriptor, an interrupt is generated by the NIC 205 to the CPU 225 to initiate the TCP/IP protocol processing of the one or more header fields 285. In response to the interrupt, the CPU 225 may directly access the one or more header fields 285 from the second local buffer 275 of the NIC 205 via the system bus. In order to determine the buffer address of the second local buffer 275, the CPU 225 may access the buffer descriptor associated with the data packet in the Random Access Memory (RAM) 230. In another example, the CPU may periodically poll the second local buffer of the NIC to read one or more header fields of a subsequent data packet.

After accessing the one or more header fields 285 from the NIC 205, the CPU 225 may modify the at least one header field 290 of the one or more header fields 285 so as to include a packet routing information. In one example, the CPU 225 may modify the at least one header field 290 of the one or more header fields 285 based on flow control information 291 pre-defined for the data packet 220. In order to include the packet routing information into the header field 280. Example flow control information 291 may be stored in the Random Access Memory (RAM) 230.

As shown in FIG. 2B, the NIC 205 may include a header field reader 292, a header field overwriting unit 293, and a port forwarder 294 to read at least one modified header field 290, to form reassembled data packet 295 which is routed as the egress data packet 296, respectively. During transmit (TX) operation 215, the NIC 205 may receive the at least one modified header field 290 from the CPU 225.

The overwriting operation may be initially performed on the one or more header fields stored in the second local buffer 275 of the NIC 205, after which the packet reassembly may be performed on the complete data packet 220 based on the field-offset and field-size of the one or more header fields 285 of the data packet 220 and the common ID read from the datastore 266. Based on the at least one modified header field 290, the data packet 296 may then be routed by the NIC 205 through appropriate PHY. Alternatively, the NIC 205 may directly overwrite the one or more header fields 285 with the at least one modified header field 290 in the data packet 220 stored in the first local buffer 270 of the NIC 205 based on the common identifier and mapping data.

FIG. 3A illustrates an example data packet 305 (e.g., HTTP frame over IPv6), in which shaded portion represents one or more header fields 310 that are to-be-extracted from the data packet 305. In this example, frame recognition (Frame_type) of the data packet 305 may be performed based on the Ethernet Ether Type: 0x86DD at 24 byte offset (implies IPv6), field-offset of the IPv6 Next Header: 0x06 at 32 byte offset (implies TCP), and field-offset of the TCP Destination Port: 0x50 at 68 byte offset (implies HTTP). In this example, the frame recognition of the data packet 305 may be performed using the:

(i) compare_value: A n-byte value to compare the packet header. In this example, the nbyte value is
    "0x86DD000000000000600000000000000000000-000000000000000
    000000000000000000000000000000000000050";
  (ii) compare_offset: The starting offset in bytes for the compared value to be matched to. In this example, the compare_offset is taken as 24 (i.e., specific to ether type);
  (iii) compare_mask: A predefined mask to apply while trying to match the field_size and field_offsets of the header fields. In this example, the compare_mask is as follow:
    "0xFFFF000000000000FF000000000000000000000-00000000000000000
    000000000000000000000000000000FFFF"; and Based on compare_value, compare_offset and compare_mask, the Frame_type (F-Type value) of the data packet 305 may be recognized as "0x00AB". After frame recognition, the complete data packet 305 may be stored in the first local buffer of the NIC. Then, the "multi-stage field extraction" may be performed on the data packet 305. As shown in FIG. 3B, the one or more header fields 310 such as "VLAN ID" field, "Ethernet Source Address (SA)" field, "Ethernet Destination Address (DA)" field, "Ethernet type" field, "IP Source Address (SA)" field, "IP Destination Address (DA)" field, "IP Protocol type" field, "TCP/UDP source" field, and "TCP/UDP Destination" field may be extracted from the data packet, at multiple stages in parallel manner.

For example, at stage. 1, the "VLAN ID" field may be extracted from the data packet 305, for which the field-offset and a field-size are as follow:
field-offset: 20 (802.1Q value is at 20 byte offset)
field-size: 4 (802.1Q filed is 8 bytes)
At stage. 2, the "MAC source address" field may be extracted from the data packet 305, for which the field-offset and a field-size are as follow:
field-offset: 14 (MAC source is at 14 byte offset)
field-size: 6 (MAC source is 6 bytes long)
Similarly, other header fields may be extracted from the data packet 305 along with a respective field-offset and a field-size.

Upon extracting the one or more header fields 310, "field matching" is performed to generate a common identifier (i.e., mapping data) for the extracted one or more header field 310 and the data packet 305. To generate the common identifier, the F_type value (Frame_type value) is taken into account. In this example, for the ftype value: 0x00AB, field_value: 0, field_mask: 0, and weight: 1, the common identifier generated may be "0x00CD".

For the "Flow Action" stage to include packet route information into the headers 310, the CPU may directly access the one or more header fields 310 from the NIC based on mapping of "the common identifier" to a buffer descriptor. Example mapping is as follow:
common id: 0x00CD;
buffer_id of second local buffer: 0x12341234 (an arbitrary address where the one or more header fields 310 are stored)
In addition to the above mapping, the NIC may store a buffer table that map the common_id to the buffer_id of first local buffer and buffer_id of second local buffer so as to reassemble/overwrite at least one modified header field (that include packet routing information included by the CPU) into the complete data packet.

Thus, as aforementioned, the NIC may be in direct communication with the CPU over the system bus so that CPU may access the one or more header field 310 and/or data packet 305 stored in the NIC.

The total-field size of the extracted header fields can be varied for the different type of data packet. For example, as shown in FIG. 3C the size of one or more header fields associated with IPv4 data packet is 34 bytes, and the size of one or more header fields associated with IPv6 data packet is 60 bytes. Now, from the above example the average packet size in the network can be assumed to be 576 bytes (based on surveys done on standard internet data traffic). The maximal effective size of these header fields' data is 60 bytes. In addition to header fields' data, status byte making the total size of the header fields' data as 61 bytes. So, the traditional way of transfer of data packets from NIC to RAM and vice-versa can reduce the maximum theoretical bandwidth by 576:61=9.44 times. In contrast, as shown in FIG. 3C, the direct access of the one or more header fields of size 35 (including 1 byte of status byte) between the NIC and the CPU get a maximal theoretical switching capacity of (576/35)*232=3818 Gbps.

FIG. 3D illustrates an example redesigned buffer descriptor 320 of the data packet 305. As shown in FIG. 3D, the buffer descriptor 320 may include status field along with the buffer pointer. The buffer pointer may point to the common identifier which is assigned to the data packet 305 stored in the first local buffer and the one or more header fields stored in the second local buffer. As the common identifier mapped to the buffer pointer, same buffer descriptor 320 may be used by the CPU at the time of receiving the incoming data packet and transmitting the egress data packet. The status fields may include Transmit and Receive Ready (TRR) field, Transmit Interrupt (TI) field, Header Type (TY) field, and Priority of Buffer queue (PR) field.

The TRR field may indicate Tx ready field of the buffer descriptor 320. In our case the R field can also be used to check on lock by device or waiting on Rx, as the same buffer is used for Tx and Rx.

The TI may be the standard interrupt on transmit field. This fields may also have an option of interrupt on transmit error. O may be the standard Rx buffer overrun field. The BS field may denote the number of buffers in the array.

Note that by using the TY field we get flexibility in choosing different size header field types for the buffer and different buffer descriptors for various data packets (e.g., IPv4, IPv6 and MPLS). This can help achieve maximum throughput as because of smaller sized header fields size.

The PR may be an optional field which associates a priority for the buffer queue. Since the packets will be processed by the CPU, and the device has no control over that, it can at least associate some priority with the QoS values.

Other than the abovementioned field, status fields may include error status and parameters for individual buffers. For this we will use the 1 byte we reserved in the extracted header fields data. Potential information may be stored in error status and parameters field to identify the error on receive, frame length violation, non-octet aligned frame, short frame, CRC error and collision error. Potential information can be stored in stored in error status and parameters field CRC calculation, retransmission limit, retry count.

Figure 4:
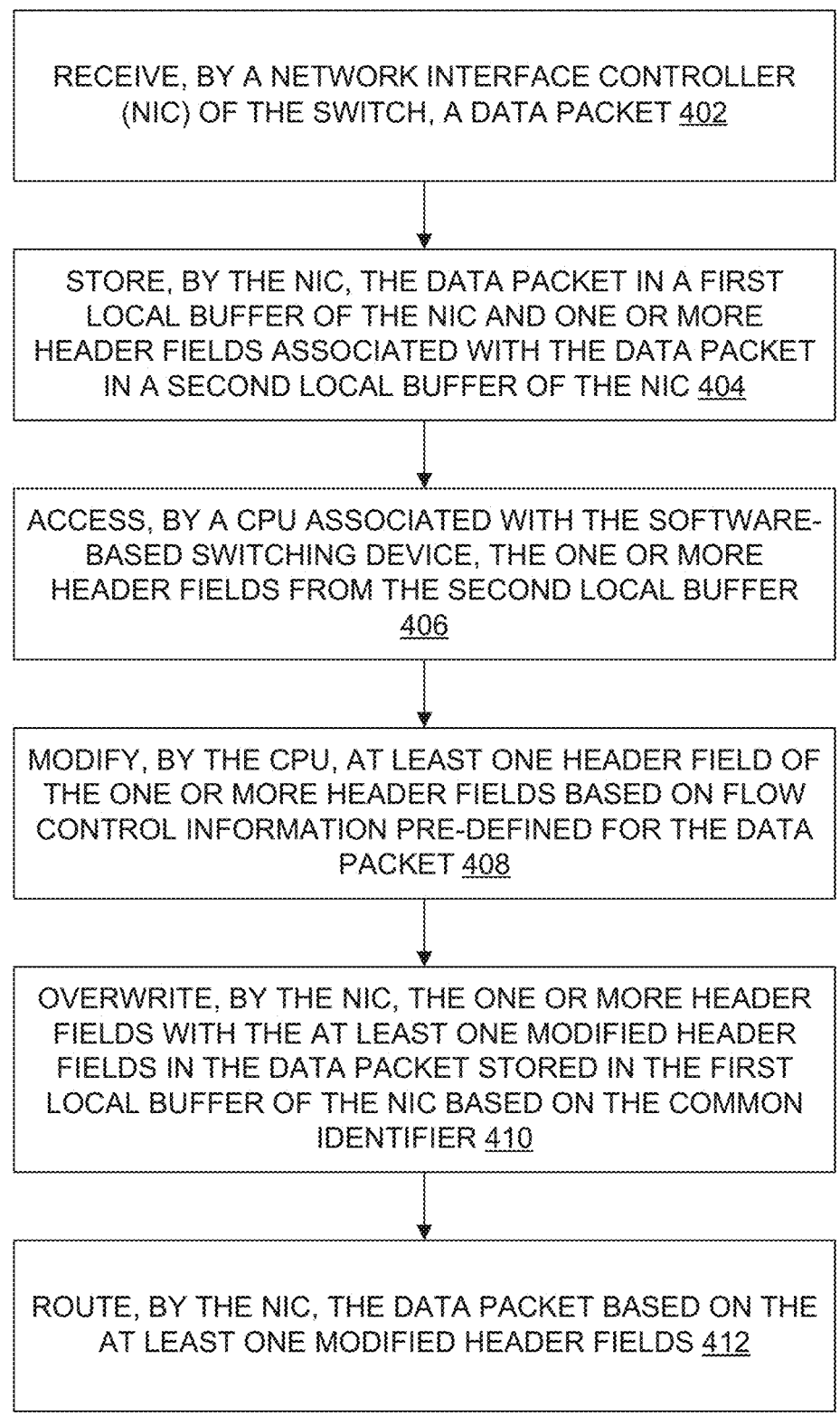
FIG. 4 is a flow diagram illustrating steps performed at software-based network switch to improve switching capacity in a software-based network switch, in accordance with an exemplary embodiment of the present disclosure.

Referring now to FIG. 4, is a flow diagram illustrating steps performed at a network switch that provide direct access between the NIC and the CPU. As illustrated in the flowchart, at step 402, the NIC of the network switch may receive a data packet from the network. At step 404, the NIC may store the data packet in a first local buffer of the NIC and one or more header fields associated with the data packet in a second local buffer of the NIC. The data packet stored in the first local buffer and the one or more header fields stored in the second local buffer are assigned a common identifier by the NIC.

At step 406, the CPU associated with the software-based network switch may access the one or more header fields from the second local buffer in response to an interrupt generated by the NIC. In one example, the CPU may access a buffer descriptor associated with the data packet in the Random Access Memory (RAM) to determine a buffer address of the second local buffer. Used herein, the buffer descriptor is mapped to the buffer address of the second local buffer. At step 408, the CPU may modify at least one header field of the one or more header fields based on flow control information pre-defined for the data packet. In one example, the flow control information stored in the Random Access Memory (RAM).

At step 410, based on the common identifier, the NIC may overwrite the one or more header fields with the at least one modified header fields in the data packet stored in the first local buffer of the NIC. At step 412, based on the at least one modified header fields, the data packet may be routed by the NIC.

Figure 5:
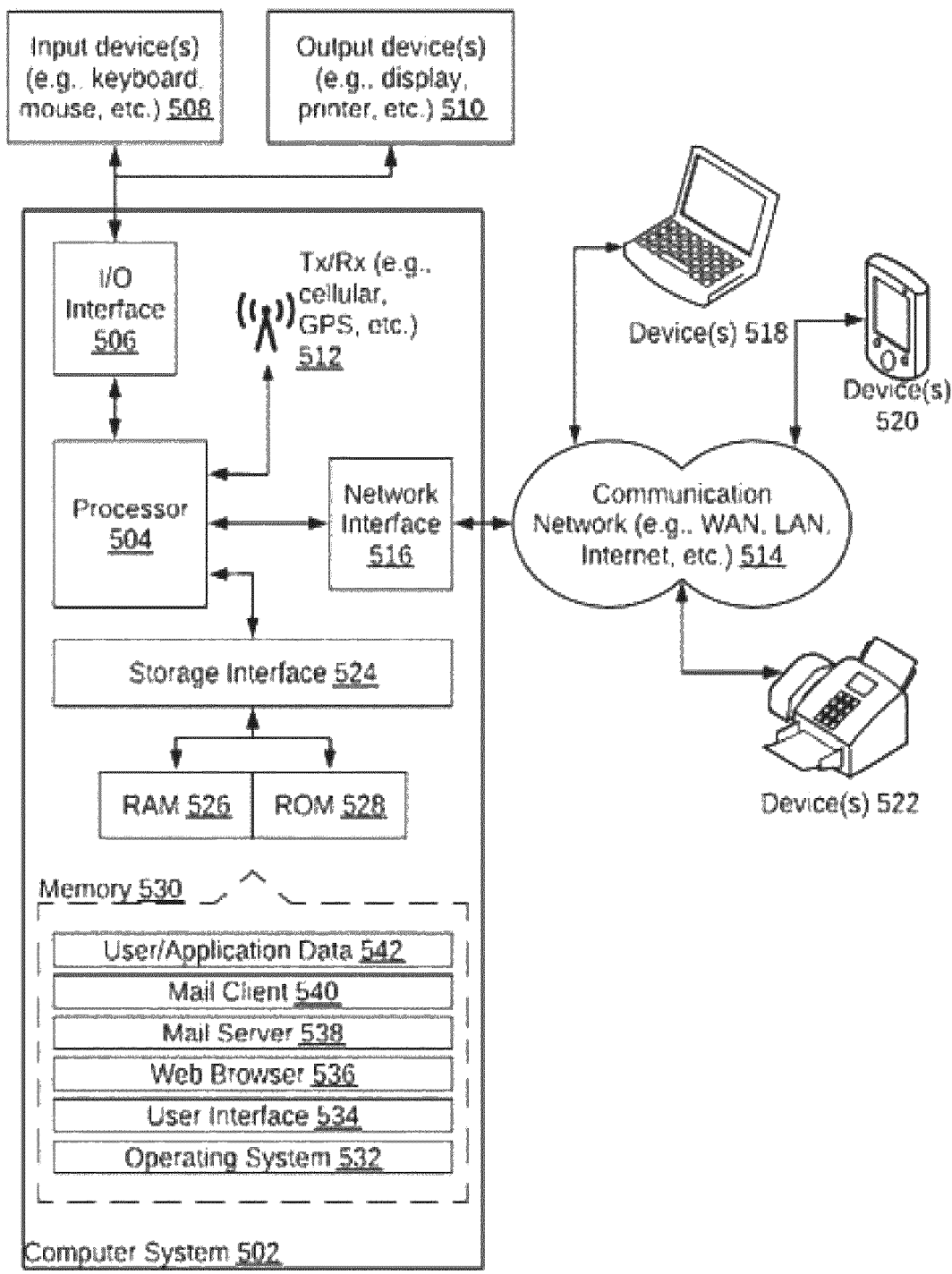
FIG. 5 is a block diagram of an exemplary computer system for implementing embodiments consistent with the present disclosure.

FIG. 5 is a block diagram of an exemplary computer system for implementing various embodiments. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of improved switching capacity in a software-based network switch, the method comprising:
   receiving, by a Network Interface Controller (NIC) of the software-based network switch, a data packet;
   storing, by the NIC, the data packet in a first local buffer of the NIC and one or more header fields associated with the data packet in a second local buffer of the NIC, wherein the data packet stored in the first local buffer and the one or more header fields stored in the second local buffer are assigned a common identifier;
   accessing, by a CPU associated with the software-based network switch, the one or more header fields from the second local buffer, wherein the CPU periodically polls the second local buffer of the NIC to read one or more header fields of a subsequent data packet;
   modifying, by the CPU, at least one header field of the one or more header fields based on flow control information pre-defined for the data packet;
   overwriting, by the NIC, the one or more header fields with the at least one modified header field in the data packet stored in the first local buffer of the NIC based on the common identifier; and
   routing, by the NIC, the data packet based on the at least one modified header field.

2. The method of claim 1, wherein the CPU accesses a buffer descriptor associated with the data packet in Random Access Memory (RAM) to determine a buffer address of the second local buffer, wherein the buffer descriptor is mapped to the buffer address of the second local buffer.

3. The method of claim 1, wherein the CPU modifies the one or more header fields based on flow control information from Random Access Memory (RAM) associated with the software-based network switch.

4. The method of claim 1, wherein an interrupt is generated by the NIC to the CPU on storing the one or more header fields in the second local buffer.

5. The method of claim 4, wherein the CPU reads the one or more header fields from the second local buffer of the NIC in response to the interrupt.

6. The method of claim 1, wherein the CPU reads the one or more header fields in the second local buffer of the NIC through a system bus.

7. A system of improved switching capacity in a software-based network switch, the system comprising:
   a Network Interface Controller (NIC) comprises:
   an interface port to receive a data packet; and a plurality of local buffers comprise:

a first local buffer to store the data packet and a second local buffer to store one or more header fields associated with the data packet, wherein the data packet stored in the first local buffer and the one or more header fields stored in the second local buffer are assigned a common identifier;

a CPU to:

access the one or more header fields from the second local buffer, wherein the CPU periodically polls the second local buffer of the NIC to read one or more header fields of a subsequent data packet; and modify at least one header field of the one or more header fields based on flow control information pre-defined for the data packet, wherein the NIC is to:

overwrite the one or more header fields with the at least one modified header field in the data packet stored in the first local buffer of the NIC based on the common identifier; and route the data packet based on the at least one modified header field.

8. The system of claim 7, wherein the CPU accesses a buffer descriptor associated with the data packet in Random Access Memory (RAM) to determine a buffer address of the second local buffer, wherein the buffer descriptor is mapped to the buffer address of the second local buffer.

9. The system of claim 7, wherein the CPU modifies the one or more header fields based on flow control information from Random Access Memory (RAM) associated with the software-based network switch.

10. The system of claim 7, wherein an interrupt is generated to the CPU on storing the one or more header fields in the second local buffer of the NIC.

11. The system of claim 10, wherein the CPU reads the one or more header fields from the second local buffer of the NIC in response to the interrupt.

12. The system of claim 7, wherein the CPU reads the one or more header fields in the second local buffer of the NIC through a system bus.

\* \* \* \* \*